UNITED STATES PATENT OFFICE.

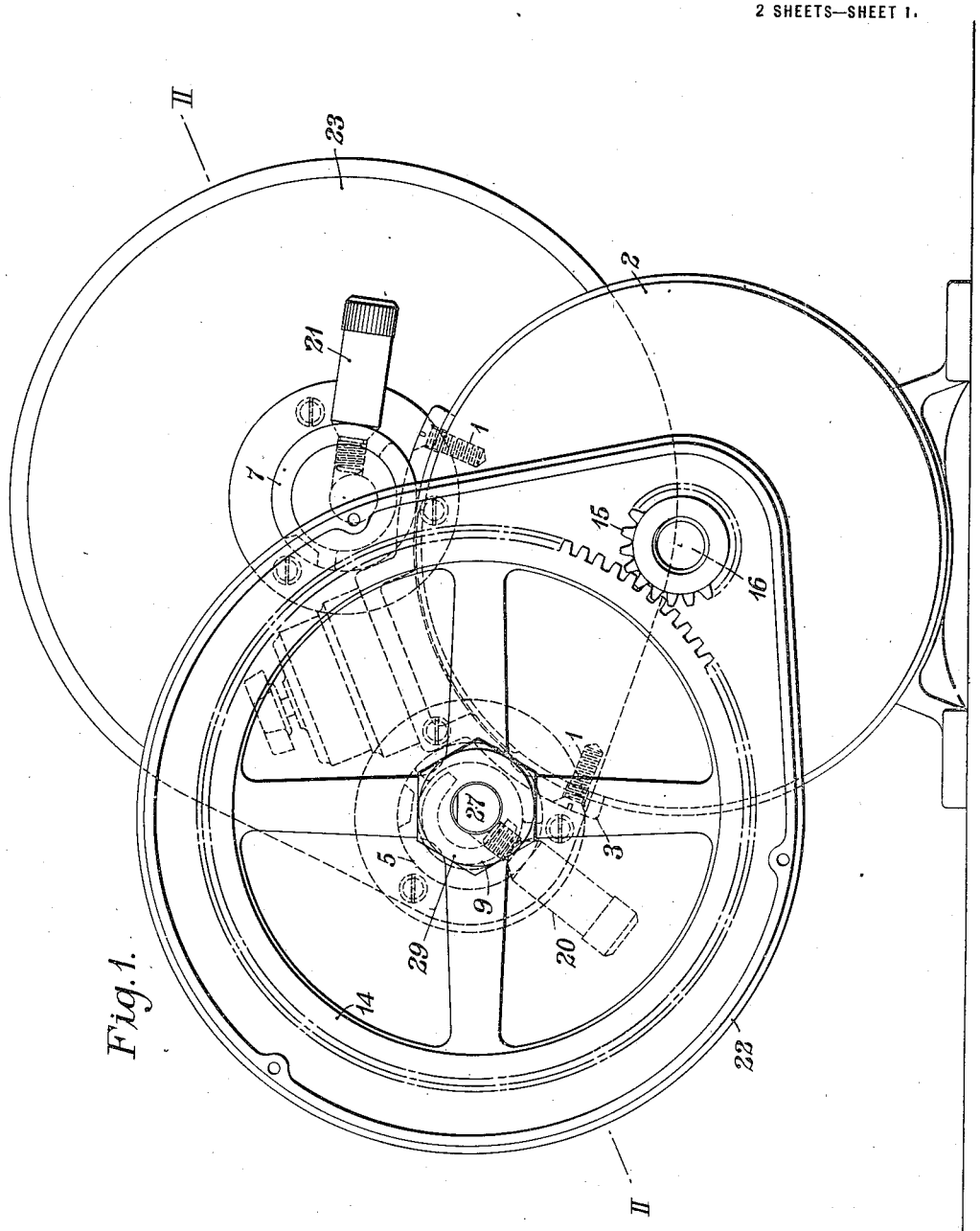

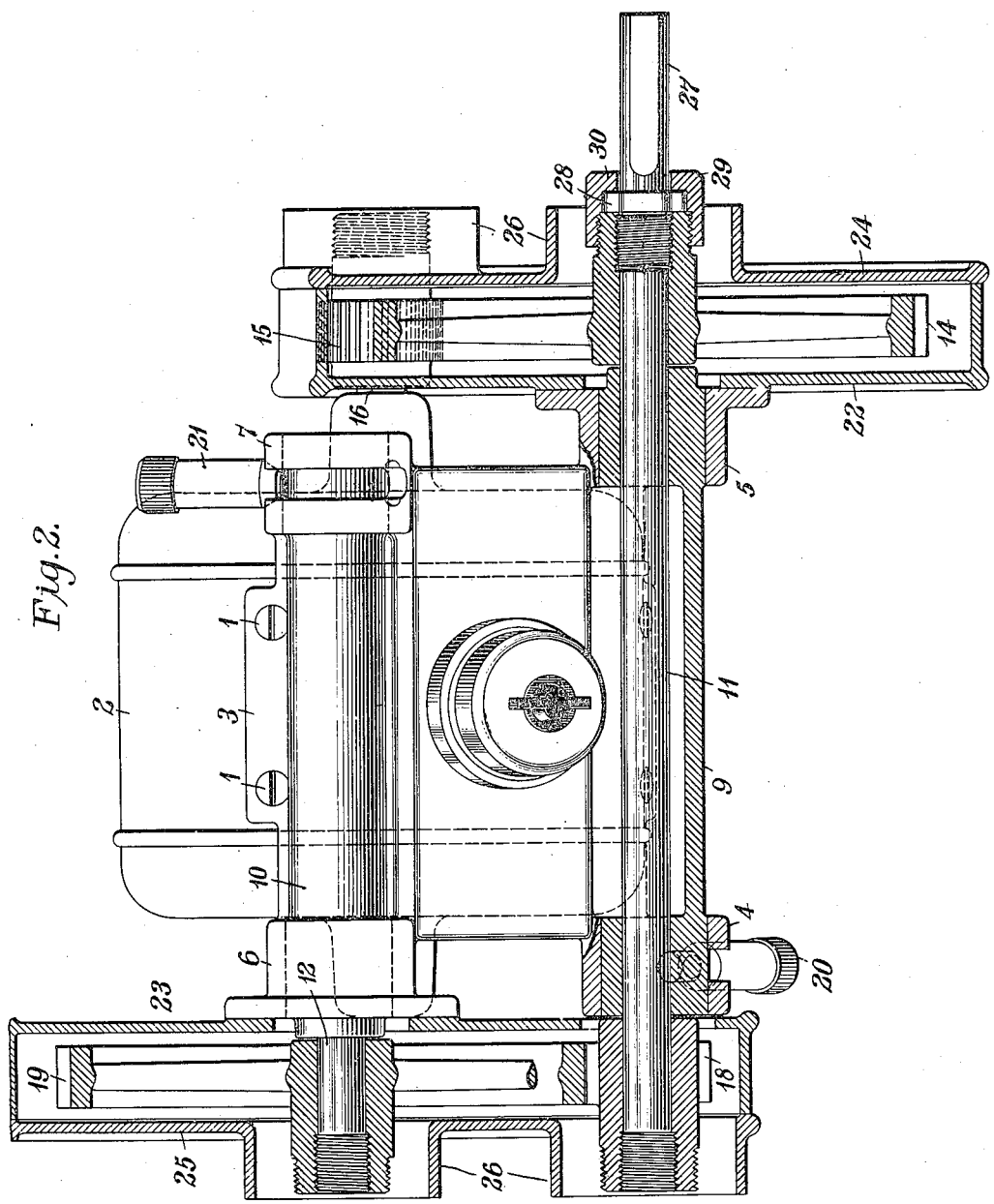

WILFRED BARNES, JR., OF WILKINSBURG, PENNSYLVANIA, ASSIGNOR TO WESTINGHOUSE ELECTRIC AND MANUFACTURING COMPANY, A CORPORATION OF PENNSYLVANIA.

SPEED-CHANGING GEARING.

1,173,639.   Specification of Letters Patent.   Patented Feb. 29, 1916.

Application filed February 21, 1911. Serial No. 609,950.

*To all whom it may concern:*

Be it known that I, WILFRED BARNES, Jr., a citizen of the United States, and a resident of Wilkinsburg, in the county of Allegheny and State of Pennsylvania, have invented a new and useful Improvement in Speed-Changing Gearing, of which the following is a specification.

My invention relates to speed-changing gearing, and it has for its object to provide an attachment that may be applied to electric or other motors of standard construction without requiring alteration or modification thereof, and that comprises speed-changing gearing by means of which a plurality of substantially constant speeds may be obtained from the motors.

Another object of the invention is to provide guards for the ends of the shafts of the speed-changing mechanism which prevents accidental engagement with users and external objects, and a still further object is to provide means for extending any shaft of the mechanism beyond the guard therefor, so that an operative connection may be made thereto and the shaft rotated in either direction.

Figure 1 of the accompanying drawing is an end view of a motor equipped with speed-changing gearing constructed in accordance with my invention, and Fig. 2 is a plan and sectional view of the speed-changing gearing shown in Fig. 1, the sectional view being along the line II—II of Fig. 1.

Secured by means of tap screws 1 to the top of an electric or other suitable motor 2, is a saddle or bracket 3 having two pairs of projecting alined sleeves 4—5 and 6—7 in which are mounted eccentric bearing members 9 and 10, respectively, for shafts 11 and 12. Upon one end of the shaft 11 is a gear 14 that is adapted to mesh with a pinion 15 upon the end of the motor shaft 16, and the respective hubs of the said gear and the said pinion are extended beyond the ends of the shafts on which they are mounted and are both internally and externally threaded, the internal threads being of right-hand pitch while the external threads are of left-hand pitch, or vice versa.

Upon the end of the shaft 11, opposite the gear 14, is a pinion 18 that is similar in construction to the pinion 15 and is adapted to mesh with a gear 19, similar in construction to the gear 14 and similarly secured upon the end of the shaft 12.

The sleeves 4 and 7 are circumferentially slotted, to provide guides for pins 20 and 21, respectively, that are threaded into the bearing members 9 and 10 and constitute handles for rotating the same within their supporting sleeves so as to throw the gears carried by the several shafts into and out of mesh. The pins 20 and 21 are somewhat reduced in diameter at their threaded ends and the shoulders between the larger and smaller portions thereof are tapered, the sleeves 4 and 7 being correspondingly counter-sunk at the ends of the circumferential slots therein to provide seats or recesses for the said shoulders. Thus, the gears carried by the several shafts may be locked in or out of mesh by turning the pins so as to cause the shoulders thereon to be seated in the said recesses.

The gears 14, 15, 18 and 19 are inclosed by gear casings 22 and 23 that are respectively secured to the sleeves 5 and 6 and are provided with covers 24 and 25 having cylindrical projections or sleeves 26 upon their outer faces that surround the ends of the hubs of the gears and pinions and extend parallel thereto a slight distance beyond their extremities to prevent accidental engagement of said ends with users and external objects.

An operative connection may be made to any one of the shafts 11, 12 and 16 by means of a member 27 that is adapted to extend such shaft beyond the guard sleeve 26 therefor. The member 27 comprises a relatively short rod or shaft having an intermediate collar or shoulder 28 and a threaded end that is adapted to be screwed into the end of a gear or pinion hub as far as the collar or shoulder. A nut 29, having an internally projecting flange 30 upon its outer end is adapted to be screwed upon the outer surface of the gear or pinion hub until the flange 30 engages the shoulder or collar 28 upon the extension member 27. Since the threads upon the interior and exterior of the hubs are of opposite pitch, it is immaterial as to which direction the shafts are rotated, as the extension member 27 will be securely attached to the hub under all conditions.

I claim as my invention:

1. The combination with a shaft and gear member thereon, of a gear casing having a guard sleeve for the hub of said gear member, and a detachable shaft extension that projects through and beyond the guard sleeve.

2. The combination with a shaft and a gear member thereon, of a gear casing having a guard sleeve for the shaft end, and a detachable shaft extension that projects through and beyond the guard sleeve.

3. The combination with a shaft, and a gear mounted thereon the hub of which extends beyond the end of the shaft and is externally and internally threaded in opposite directions, of a shaft extension having an intermediate collar and one end screwed into the said sleeve as far as the collar, and a nut screwed upon the sleeve and engaging the outer end faces of the collar on the shaft extension.

4. The combination with a shaft, and a gear mounted thereon the hub of which extends beyond the end of the shaft and is externally and internally threaded, of a shaft extension having an intermediate collar and one end screwed into the said sleeve as far as the collar, and a nut screwed upon the sleeve and engaging the outer end faces of the collar on the shaft extension.

5. The combination with a plurality of parallel shafts and separable gear connections between them, of gear casings having guard sleeves for the ends of said shafts, and a detachable shaft extension adapted to be attached to any one of the guarded shaft ends.

In testimony whereof, I have hereunto subscribed my name this eleventh day of February 1911.

WILFRED BARNES, Jr.

Witnesses:
 Wm. E. Larrebee,
 E. D. Chappell.